May 8, 1951 R. H. ANDRESEN 2,552,023
ELECTRIC MOTOR-DRIVEN AGITATOR
Filed March 15, 1949 2 Sheets-Sheet 1

INVENTOR.
Raymond H. Andresen,
BY
Cromwell, Greist & Warden
Attys

May 8, 1951 R. H. ANDRESEN 2,552,023
ELECTRIC MOTOR-DRIVEN AGITATOR
Filed March 15, 1949 2 Sheets-Sheet 2
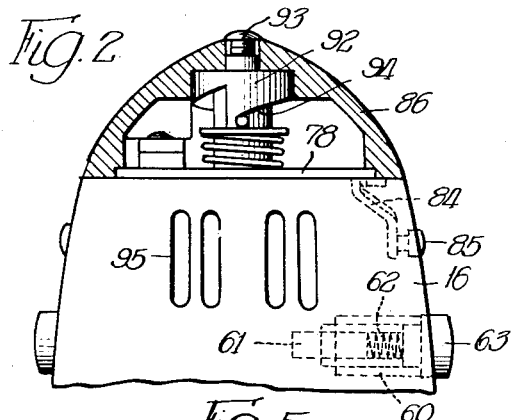
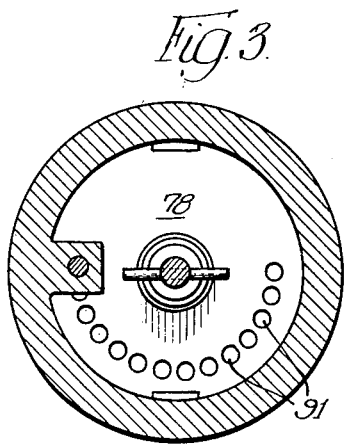
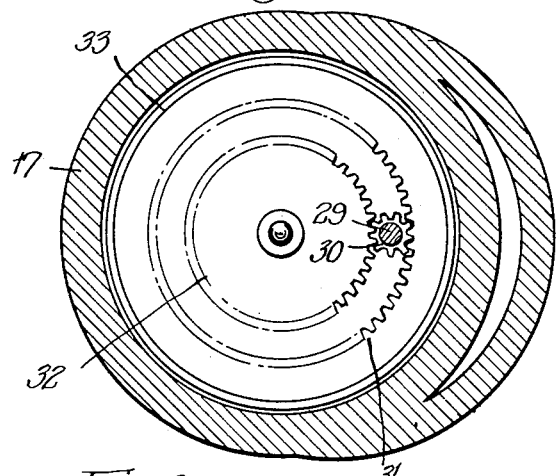
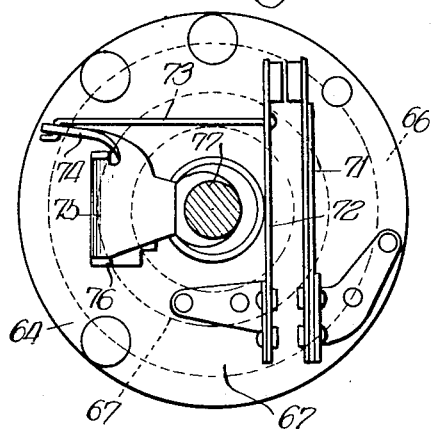
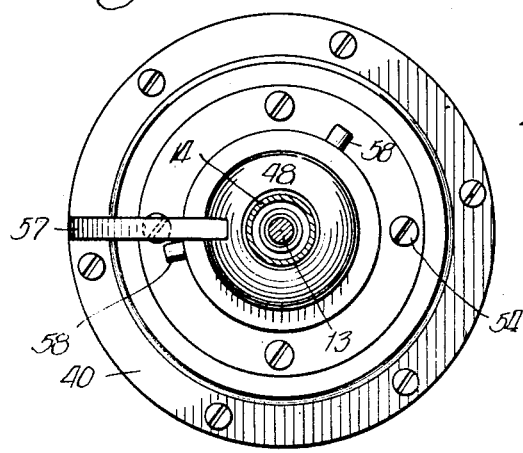
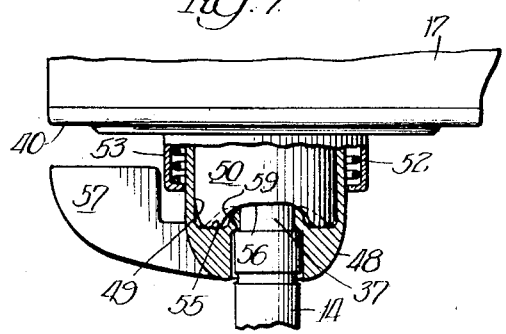
INVENTOR.
Raymond H Andresen,
BY
Cromwell, Greist & Warden Patented May 8, 1951

2,552,023

UNITED STATES PATENT OFFICE 2,552,023

ELECTRIC MOTOR-DRIVEN AGITATOR

Raymond H. Andresen, Chicago, Ill., assignor to Edgar J. Schoen and Herbert J. Schoen, both of Chicago, Ill.

Application March 15, 1949, Serial No. 81,555

5 Claims. (Cl. 172—36)

This invention is concerned with improvements in a food mixer.

It is an object of the invention to provide a food mixer of the portable hand manipulated type which is simple, compact, light in weight, of rugged construction and which will operate efficiently to mix various kinds of materials having varying viscosities.

A more specific object of the invention is to provide a food mixer comprising a casing having enclosed therein a light compact driving motor and bearing supporting structures mounted axially of the motor shaft and providing at opposite ends of the casing compartments for housing a speed controlling device and driving gears, respectively, the driving gears being adapted to rotate in opposite directions concentrically mounted beater shafts, and the compartment housing the driving gears being closed by a plate on which the gears and the drive mechanism connecting the gears with the beater shafts are supported.

A further object of the invention is to provide a food mixer of the type described in which a driving motor, a cooling fan, a speed regulating and control mechanism and gear mechanism for driving concentrically arranged beater shafts are operatively associated by supporting structures which are adapted to be readily assembled and disassembled to provide greater economy in manufacture and more convenient repair and maintenance.

It is another object of the invention to provide in a food mixer construction a driving motor and a driving mechanism for concentrically arranged beater shafts which provide vibrationless operation of the beater shafts.

It is a further object of the invention to provide in a food mixer a driving motor, a regulator and control device for varying the speed of the motor, and a gear driving mechanism for concentrically arranged beater shafts.

It is another object of the invention to provide in a food mixer of the type described a driving motor, a gear mechanism for driving concentrically arranged beater shafts and connecting mechanism between the driving gears and the beater shafts providing for ready release of the shafts from the gear mechanism.

These and other objects and advantages will be apparent from a description of the preferred form of the food mixer which is shown by way of illustration in the accompanying drawings, wherein:

Fig. 2 is a partial front elevation of the upper portion of the mixer casing with portions broken away;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a bottom plan view; and

Fig. 7 is a fragmentary elevation of the lower portion of the mixer with portions broken away.

Figure 1:
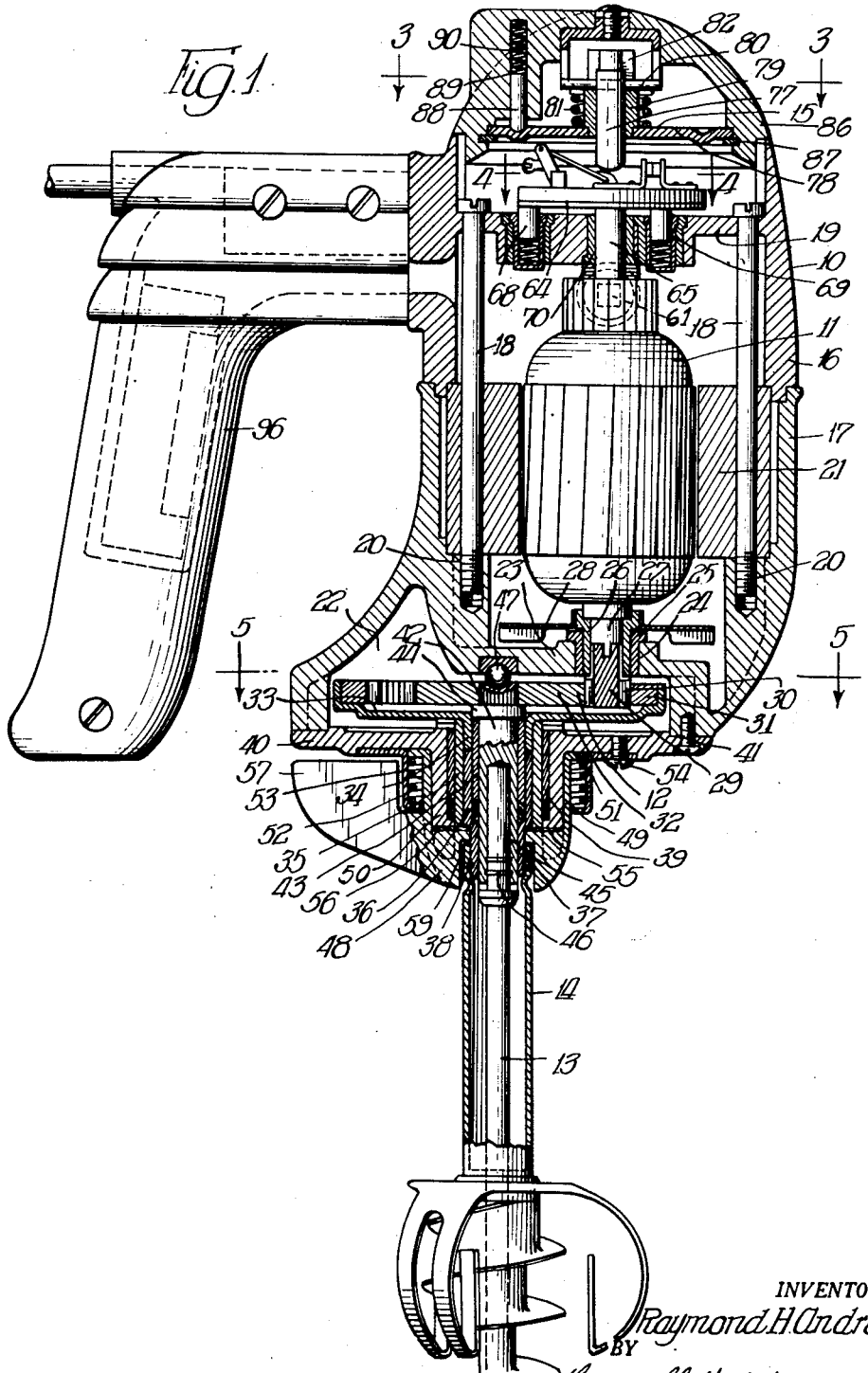
Fig. 1 is a side elevation of a food mixer embodying the principles of the invention with the greater portion thereof shown in longitudinal section.

Referring to the drawings, the mixer construction comprises a casing or housing 10 which is adapted to enclose a driving motor 11, gear mechanism 12 at one end of the motor shaft connecting the motor in driving relation to the inner ends of concentric beater shafts 13, 14 and a motor control mechanism 15 arranged in the casing 10 at the opposite end of the motor shaft for controlling the speed of operation of the motor 11.

The casing 10 includes two sections 16 and 17 which are connected together when the mixer is assembled, the sections being connected by bolts 18 extending through the transverse web 19 in the casing section 16 and engaging in screwthreaded relation in sockets 20 in the casing section 17. The connecting bolts 18 extend through apertured portions of the body or laminated stator core 21 of the motor 11 and secure the motor 11 in rigid relation in the casing 10.

The outer end of the casing section 17 is offset in an axial direction and provided with compartment 22 for accommodating the driving gears 12. The compartment 22 is separated from the main portion of the section 17 by a transverse web 23 which is apertured at 24 and provided with a bearing or bushing member 25. The bearing member 25 receives in rotatable relation a sleeve 26 which is secured to the projecting end 27 of the motor drive shaft. The sleeve 26 carries a fan construction 28. The end 27 of the motor shaft is keyed to a stub shaft 29 which carries on its outer end a gear or pinion 30. The pinion 30 engages between an outer ring gear 31 and an inner spur gear 32. The pinion 30 is in driving relation with gears 31 and 32 so that upon rotation of the motor drive shaft the gears 31 and 32 are driven in opposite directions.

The outer ring gear 31 is mounted in a holder or supporting member 33 which is provided with a hub 34. An outer sleeve 35 is secured at one end to the hub 34 and extends therefrom a substantial distance, being secured to the enlarged portion of a driving sleeve 36. The other end of the driving sleeve 36 is reduced somewhat at 37 to fit within the end of the outer tubular beater shaft 14. A spring catch 38 is provided between the outer sleeve portion 37 and the end of the shaft 14 to releasably hold the members in driving relation. The ring gear holder 33 and outer sleeve 35 are rotatably mounted in an Oilite bearing 39 which is secured in a central aperture in the cover plate 40 which closes the compartment 22 on the casing section 17 and which is removably secured thereto by screws 41 or other fastening means.

The spur gear 32 is provided with an outwardly extending shaft 42 which projects through the hub portion 34 of the bearing holder 33 and into the reduced portion 37 of the outer spindle 36 being rotatably supported therein by an Oilite bearing 43, against the end of which shoulder or flange 44 bears. The shaft 42 is provided with an outwardly opening axial socket 45 for receiving the end of the inner beater shaft 13 which is releasably held therein by fastener rings 46.

The spur gear 32 is separated from the transverse web 23 of the casing section 17 by a thrust bearing 47 in axial alignment with the shaft 42.

The cover plate 40 carries a releasing device for separating the beater shafts from the driving connector members 37 and 42. The releasing device comprises a cap-like member 48 which includes a tubular inner portion 49 embracing the hub 50 of the plate 40 and having an inner flange 51 which seats against the face of the plate 40 in the retracted position. A coil compression spring 52 bears against the flange 51 and is retained in a ring-like casing 53 which is secured by screws 54 to the outer face of the plate 40. At its outer end the cap member 48 is provided with an internal cam surface 55 which engages the cam formation 56 on the outer edge of the hub 50. The member 48 is provided with a finger gripping piece 57 by means of which it may be rotated relative to the hub 50. Movement of the finger piece 57 is limited by a pair of spaced stop pins 58 on the spring casing 53. The member 48 is provided at its outer end with an inwardly extending shoulder 59 which engages the inner end of the beater shaft 14. When the member 48 is rotated by the finger piece 57 the cam surfaces 55 and 56 cause the member 48 to move outwardly relative to the hub 50 and force the beater shafts 13 and 14 outwardly to release them from the retaining springs 38 and 46.

The casing section 16 is provided with peripherally spaced socket formations 60 for receiving the brushes 61 for the motor 11 which are held in engaging position by the springs 62 and cap screws 63.

The speed control device 15 comprises a circular plate member 64 which is secured to the end 65 of the motor shaft and which includes contact rings 66, 67 on the bottom surface thereof. Spring-pressed brushes 68, 69 are mounted in the transverse web portion 19 of section 16 on opposite sides of the bearing 70 which supports the motor shaft end 65 and engage the respective rings 66, 67. The brushes 68, 69 are insulated from the web portion 19 and are electrically connected to the current supply. The rings 66 and 67 are connected to the arm elements 71 and 72 of a breaker switch (Fig. 4) provided on the upper face of the plate 64. The arm members 71 and 72 carry at their outer ends conventional contact members and are spring urged toward each other.

A control for the contact members on the arms 71 and 72 is provided which comprises transversely extending rod 73 which projects through an aperture in the arm 72 and is headed so that predetermined movement of the rod 73 in a direction away from the arm 72 exerts a pull on the arm 72 and permits separation of the contact points on the arms 71 and 72 by centrifugal force at a lower speed. At the other end the rod 73 is pivoted to a bent arm 74 of an angular plate member 75 which is pivotally mounted on the plate 64 at 76. The free end of the plate 75 is adapted to be engaged by a pin 77 which projects downwardly through a transverse plate 78 and which is slidably mounted in an upwardly extending hub 79 on the plate 78 and which is provided with a cross pin 80 at the top end thereof. The cross pin 80 extends out over the hub 79 and is urged in an outward direction by a compression spring 81. The hub 79 is provided with aligned slots 82 to permit a limited movement of the pin 77. When the pin 77 is moved downward against the operation of the spring 81 the arm 74 of plate member 75 is depressed and moves the rod 73 in the direction away from the switch arm 72.

The transverse plate 78 is supported on downwardly directed bracket members 84 which are secured by the screws 85 to the wall of the casing section 16. An end cap 86 is secured in rotatable relation on the plate 78 by means of a spring wire fastener 87. The cap 86 carries a downwardly projecting pin 88 movable in a socket 89 and backed by a compression spring 90. The lower end of the pin 88 selectively engages in depressions or pockets 91 (Fig. 3) circumferentially spaced on the top surface of the plate 78 to provide an indexing means. In the center of the cap 86 a cam 92 is secured by a screw 93 and provided with a spiral edge 94 which engages the cross pin 80 and upon rotation of the cap 86 controls the position of the pin 77.

The casing sections 16 and 17 are provided with slots 95 at their respective opposite ends for circulating air by operation of the fan 28. At one side corresponding to the offset portion of the section 17 the section 16 is provided with a handle member 96 which houses part of the electrical connections for supplying current to the motor 11.

The operation of the mixer will be obvious from the detailed description of the parts. The current supplied to the motor is controlled by rotating the end cap 86. The concentric beater shafts 13 and 14 are driven from the motor shaft 27 through the gear arrangement. When it is desired to remove the beater elements from the mixer the finger piece 57 is rotated to cause the member 48 to move outwardly by engagement of cam surfaces 55 and 56. Movement of the shoulder 59 against the end of shaft 14 forces the shafts 13 and 14 to move outwardly and disengages latching rings 38 and 46 permitting bodily removal of the shafts 13 and 14.

While specific details of construction have been referred to in describing the illustrated form of the mixer, it will be understood that other details of construction may be resorted to within the scope of the invention.

I claim:

1. In a motor driven food mixer, a casing comprising complementary motor enclosing sections having transverse web portions at opposite ends and bearings in said web portions supporting the motor drive shaft, one of said casing sections having a portion extending in axially offset relation beyond the transverse web in said section and providing an outwardly opening compartment, an end plate adapted to be positioned on the end of said casing section to close said compartment, concentric inner and outer beater shaft connecting members journaled in said end plate and extending into said compartment in axial offset relation to said motor drive shaft, concentric gear members including an outer ring gear and an inner spur gear secured on the inner ends of said connecting members, and a gear secured on the end of said motor drive shaft engaging between said concentric gear members in driving relation to rotate said beater shaft connecting members in opposite directions.

2. In a motor driven food mixer, a casing comprising complementary motor enclosing sections having transverse web portions at opposite ends and bearings in said web portions supporting the motor drive shaft, one of said casing sections having a portion extending in axially offset relation beyond the transverse web in said section and providing an outwardly opening compartment, an end plate adapted to be positioned on the end of said casing section to close said compartment, inner and outer concentric beater shaft connecting members having the inner ends thereof journaled in said end plate and extending into said compartment in axial offset relation to the motor drive shaft, concentric outer ring and inner spur gear members secured on the inner ends of said beater shaft connecting members, a pinion secured in readily separable relation on the end of said motor drive shaft engaging between said concentric gear members in driving relation to rotate said beater shaft connecting members in opposite directions and a thrust bearing between said concentric gear members and the adjacent transverse web in the casing.

3. In a motor driven food mixer, a motor enclosing casing comprising complementary sections provided with transversely extending bearing support members at opposite ends thereof, a motor secured in said casing sections and having the ends of the drive shaft mounted in bearings in said support members, concentric shaft connecting members journaled in the outer end of one of the casing sections in offset relation to the motor drive shaft, said connecting members being adapted to be detachably connected to the ends of concentric beater shafts, cooperating concentric gears mounted in driving relation between the motor shaft and said connecting members, and a beater shaft releasing device mounted on said casing for engaging said beater shafts to disconnect the same from said connecting members.

4. In a motor driven food mixer having a casing, a motor mounted in said casing, a gear mechanism in said casing connected to one end of the motor drive shaft, and connector members at the end of said casing for detachable engagement with concentric beater shafts and having driving connection with said gear mechanism, a beater shaft releasing mechanism comprising a hub portion on said casing having a cam surface at the outer end, a spring pressed cap member encompassing said hub portion in rotatable relation, said cap member having an internal cam surface coopearting with the cam surface on said hub portion when said cap member is rotated to cause said cap member to move outwardly and said cap member having an abutment shoulder engaging the end of one of said beater shafts whereby movement of the cap member outwardly disengages the beater shafts from said connector members.

5. In a motor driven agitator having a casing, a motor mounted in said casing, a gear mechanism in said casing connected to one end of the motor drive shaft, and connector members on said casing for detachable engagement with concentric beater shafts and having driving connection with said gear mechanism, a beater shaft releasing mechanism comprising a portion on said casing having a cam surface at the outer end, a spring-pressed cap member encompassing said cam surface portion in rotatable relation thereto, said cap member having an internal cam surface portion cooperating with said first mentioned cam surface portion when said cap member is rotated to cause said cap member to move outwardly, and cooperating abutment forming portions on said cap member and the outer one of said beater shafts whereby movement of the cap member outwardly disengages the beater shafts from said connector members.

RAYMOND H. ANDRESEN.

REFERENCES CITED

The following references are of record in the file of this patent:

UNITED STATES PATENTS

| Number | Name | Date |
|---|---|---|
| 512,258 | Murrey | Jan. 2, 1894 |
| 675,709 | Blum | June 4, 1901 |
| 1,411,539 | Sweetland | Apr. 4, 1922 |
| 1,424,879 | Carlstedt | Aug. 8, 1922 |
| 1,939,399 | Larsh | Dec. 12, 1933 |
| 2,192,845 | Bean | Mar. 5, 1940 |
| 2,209,287 | Simpson | July 23, 1940 |
| 2,292,566 | Jordan | Aug. 11, 1942 |
| 2,417,195 | Hargreaves | Mar. 11, 1947 |

FOREIGN PATENTS

| Number | Country | Date |
|---|---|---|
| 429,333 | Great Britain | May 28, 1935 |